June 8, 1937.  O. B. GERDIN  2,082,948

LAWN MOWER SHARPENER

Original Filed Dec. 9, 1933  2 Sheets-Sheet 1

INVENTOR
Olof B. Gerdin
BY Fred C. Matheny
ATTORNEY

June 8, 1937. O. B. GERDIN 2,082,948
LAWN MOWER SHARPENER
Original Filed Dec. 9, 1933 2 Sheets-Sheet 2
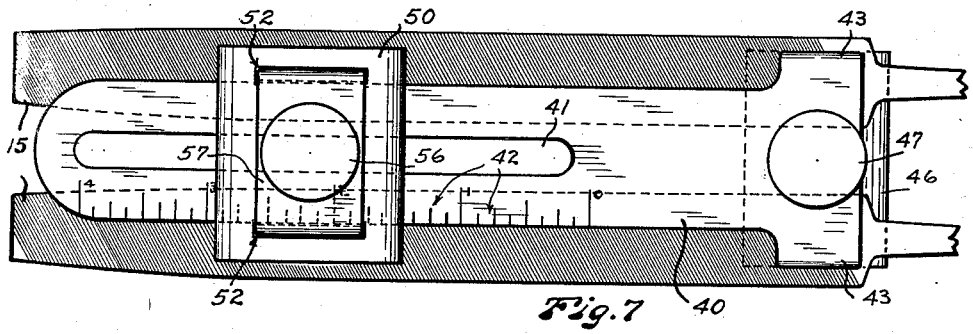
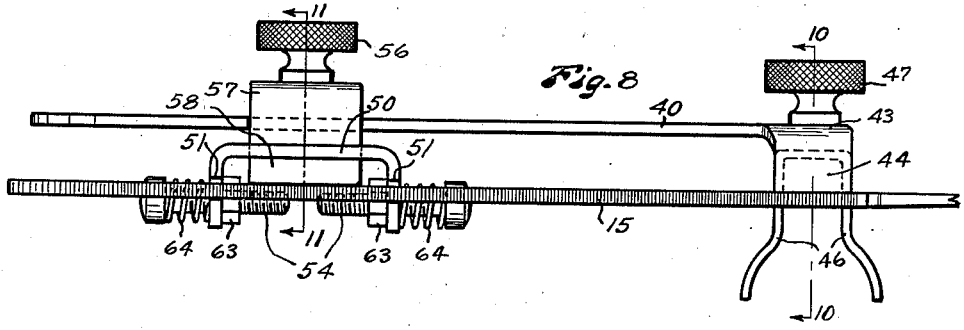
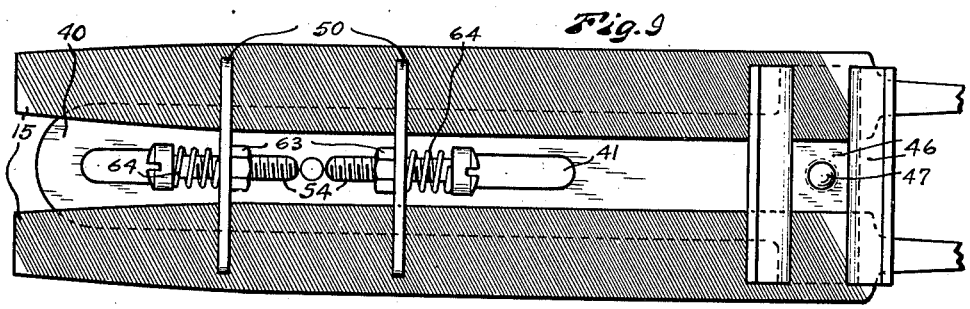
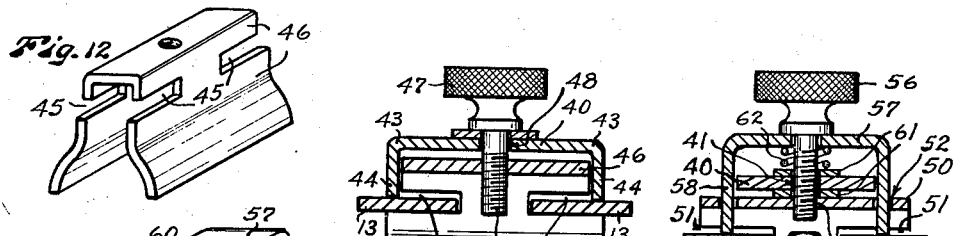
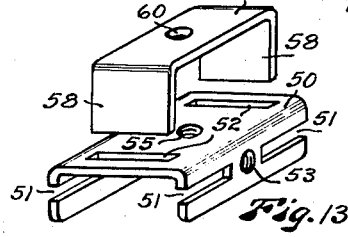
INVENTOR
Olof B. Gerdin
BY Fred C. Matheny
ATTORNEY Patented June 8, 1937

2,082,948

UNITED STATES PATENT OFFICE 2,082,948

LAWN MOWER SHARPENER

Olof B. Gerdin, Seattle, Wash., assignor of one-third to W. E. Stafford and one-third to G. W. Gustafson, both of Seattle, Wash.

Application December 9, 1933, Serial No. 701,656
Renewed November 7, 1936

8 Claims. (Cl. 76—82.1)

My invention relates to lawn mower sharpeners and the general object of my invention is to provide a simple and efficient lawn mower sharpener of inexpensive and compact construction which may be applied directly to an ordinary lawn mower to sharpen the curved blades of the same.

Another object of my invention is to provide a lawn mower sharpener embodying combined file holding means and adjustable guide means together with a gauge to facilitate the correct setting of the adjustable guide means.

Another object is to provide a lawn mower sharpener of this nature embodying a blade guide having screws which contact and guide the blade, said screws being adjustable for blades of different thickness and to compensate for wear.

Another object is to provide a lawn mower sharpener which is applied directly to a lawn mower for sharpening the same without dismounting or dis-assembling any of the parts of the lawn mower.

Another object of my invention is to provide a lawn mower sharpener of this nature which sharpens the blades uniformly throughout their entire length and which sharpens the blades entirely out to the ends thereby eliminating bumps and high spots and providing blades which operate smoothly and efficiently.

Another object is to provide a lawn mower sharpener embodying simple and efficient means for releasably clamping and securely holding an ordinary file in such a manner that the file may be applied to the blades of a lawn mower in a correct position for sharpening the blades at the proper bevel and in such a manner that the file may be quickly and easily adjusted in the holder when one area becomes worn to bring a new file area into proper position for use on the blades.

Other and more specific objects of the invention will be apparent from the following description taken in connection with the accompanying drawings.

In the drawings Fig. 1 is a plan view of a lawn mower sharpener constructed in accordance with my invention, said sharpener comprising file holding means with a single file supported therein.

Fig. 7 is a top plan view of a lawn mower sharpener embodying a duplex file holding means which is adapted to receive and hold two files.

Fig. 8 is a side elevation of the duplex device shown in Fig. 7.

Fig. 9 is an inverted plan view of the said duplex device.

Figs. 10 and 11 are views in cross section respectively on broken lines 10—10 and 11—11 of Fig. 8.

Figs. 12 and 13 are detached perspective views showing details of the duplex sharpener device.

Figure 1:
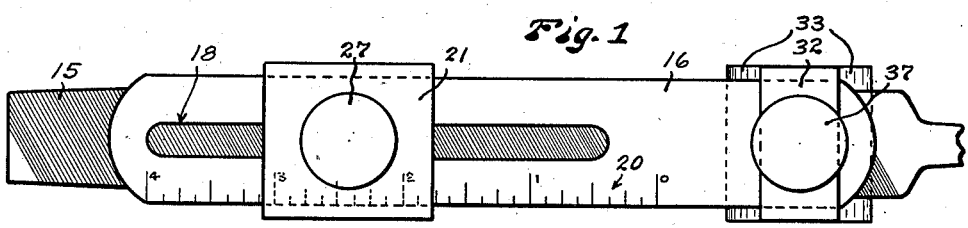
Figure 2:
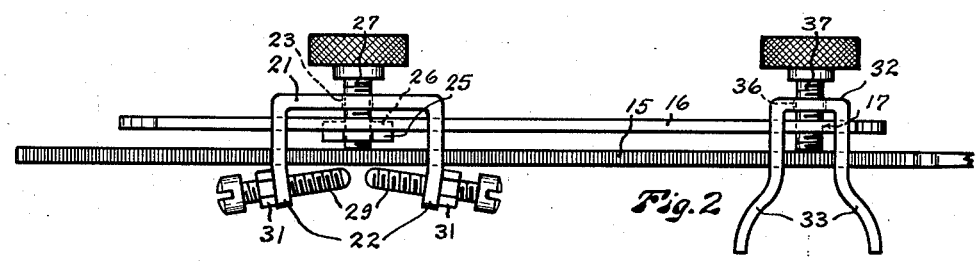
Fig. 2 is a side elevation of the sharpener shown in Fig. 1.
Figure 3:
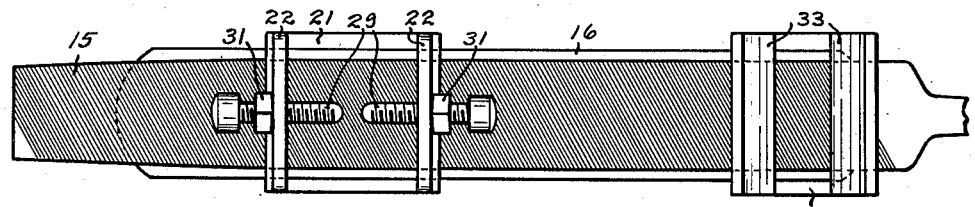
Fig. 3 is a bottom plan view of the same.
Figure 4:
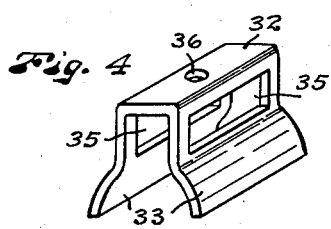
Figs. 4 and 5 are detached perspective views of details of the invention.
Figure 5:
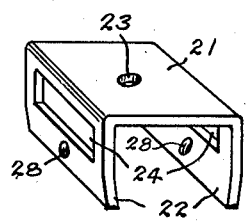
Figure 6:
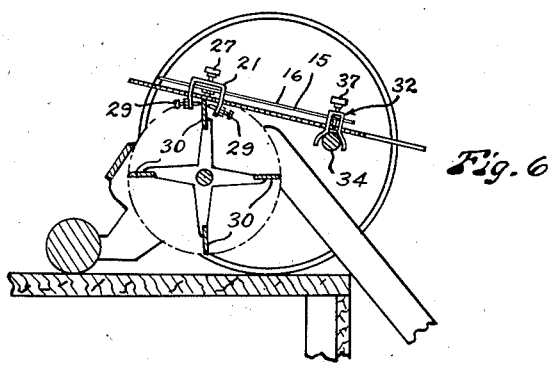
Fig. 6 is a somewhat diagrammatic view illustrating the operation of this lawn mower sharpener.

Referring to Figs. 1 to 6 inclusive I show a lawn mower sharpener which employs a single file 15 as the sharpening element. In said Figs. 1 to 6 the file holding means and guide means comprises a gauge plate 16 having a threaded hole 17 adjacent one end and having a longitudinally extending slot 18 toward the other end. Suitable graduations 20 are provided on the upper side of the gauge to assist in positioning a blade guide member as hereinafter set forth. The blade guide member consists of a channel shaped element having a top portion 21 and two side flanges 22. A hole 23 is provided in the approximate center of the top portion 21 and two oppositely positioned slots 24 are provided in the respective side flanges 22. The file 15 and gauge plate 16 extend through the slots 24. A nut 25 is provided between the file 15 and gauge plate 16. The nut 25 may have a flattened portion 26 on the upper side thereof which extends upwardly into the slot 18 and prevents the nut from turning. A thumb screw 27 extends downwardly through the hole 23 in the top 21 of the channel shaped guide member and through the slot 18 and screws into the nut 25. Turning the screw 27 in one direction in the nut 25 will simultaneously cause it to draw the gauge plate 16 against the guide portion 21 and thrust the end of the screw against the file 15 thus tightly clamping the file 15 to the channel shaped guide member and tightly clamping the channel shaped guide member to the gauge plate 16. This forms a very rigid and substantial connection between the channel shaped guide member, the gauge plate and the file whereby the file is rigidly supported in spaced relation from the gauge plate.

The two lower end portions of the side flanges 22 of the channel shaped guide member are preferably bent inwardly at a relatively slight angle toward each other and are each provided with a threaded hole 28 for the reception of a guide screw 29. The two guide screws 29 are oppositely positioned and have rounded ends which are spaced a short distance from each other and are positioned close to the file and are arranged to engage with opposite sides of a lawn mower blade 30 to guide said lawn mower blade in the process of sharpening the same. Lock nuts 31 are preferably provided on the screws 29 to lock them in adjusted position. These screws are quickly and easily adjusted to compensate for wear or so that they will fit closely to blades of different thickness. In practice I find that there is considerable wear on the ends of these screws 29 and that the sharpener will operate more efficiently and do better work if these screws are maintained in adjustment so that they will just afford clearance for the blade. By setting these screws 29 at an angle the ends of the same are positioned very close to the file thereby avoiding danger of the ends of these screws striking against the ends of the arms or other means which support the blades and which are usually fastened to the sides of the blades.

A positioning member having a cross sectional shape somewhat like an inverted letter U is mounted on the end portion of the gauge bar 16 remote from the slot 18. This positioning member comprises a flat upper portion 32 and two side flanges 33 which are curved outwardly away from each other toward their lower ends to adapt them to fit over and rest upon a transverse frame or truss bar 34 which is a part of the construction of an ordinary lawn mower. Slots 35 are provided in the side flanges 33 for the reception of the gauge plate 16 and file 15. The flat upper portion 32 of the positioning member has a centrally positioned hole 36 for the reception of a thumbscrew 37. The hole 36 is preferably not threaded and the thumbscrew 37 is slidable in said hole 36 and is threaded through the hole 17 in the gauge plate 16. Turning the thumb-screw in the proper direction to screw it downwardly in the threaded hole 17 will draw the gauge plate 16 tightly against the upper walls of the slots 35 and at the same time will cause the end of the thumbscrew 37 to jam or clamp tightly against the file 15 thus firmly securing the file to the positioning member and gauge plate.

In the operation of this lawn mower sharpener the mower is preferably inverted or tilted in such a manner that the blades are clear and free to turn and the mower is in convenient position for application of the sharpener thereto. The sharpener is applied to the mower by placing the positioning member 33 on the truss bar 34 of the mower and placing the blade 30 which is to be sharpened in the file way between the ends of the two guide screws 29. By loosening the thumbscrew 27 and moving the blade guide member 21—22 lengthwise of the gauge bar 16 it is possible to position this blade guide member so as to secure any desired bevel on the edge of the blade 30. After the most efficient bevel for the blades of any mower has been determined the reading on the gauge at the edge of the blade guide member may be observed and thereafter the blade guide member may always be set at this reading for use on that mower or other mowers of similar dimensions. If the correct settings of the blade guide member for certain standardized types and sizes of mowers is known it will be possible to set this blade guide member correctly for these different mowers without trial. The file 15 must be adjusted from time to time to bring a new sharpening surface in registration with the mower blade and thereby make it possible to utilize the entire surface of both sides of said file. In making these file adjustments the setting of the blade guide member may be disturbed. The graduations on the gauge plate afford reference marks to which the blade guide member may always be re-set after file adjustments are made.

After the sharpener has been placed on a lawn mower with the blade guide member properly adjusted and placed over a blade 30 and the positioning member 32—33 resting on the truss bar 34 of the mower the sharpener may be moved back and forth throughout the length of the blade reel of the mower thus sharpening the blade evenly by strokes of the file which are continuous from one end of the blade to the other. As the sharpener is moved along the mower blade the guide screws 29 impart angular movement to the blade reel and maintain the blade always in the correct relation to the file thus making it possible to sharpen the curved mower blade evenly from end to end.

In Figs. 11 to 13 inclusive I have shown a lawn mower sharpener in which my file holding means is constructed so that it will receive and clamp and hold two files and thereby afford a wider sharpening element, which will sharpen the blade more evenly than the single file sharpener and will tend to eliminate high spots and low spots in the cutting edge of the blade and will sharpen the blade entirely to the end thereof due to the fact that the files overhang the edges of the holder means.

The file holding means shown in Figs. 7 to 13 comprises a main support in the nature of a gauge plate 40 having a longitudinal slot 41 and provided with graduations 42. Near one end the gauge plate 40 is provided with oppositely extending side flanges 43 which are bent at right angles to the plane of the gauge plate to form foot portions 44 which are adapted to rest upon and clamp two files 15 respectively. The files 15 are disposed within notches 45 in the sides of a positioning member 46 which is generally similar in shape to the positioning member 21—22. Those portions of the positioning member 46 which are positioned above the notches 45 are shortened at the ends as more clearly shown in Figs. 10 and 12 so that the foot portions 44 of the gauge plate may extend down over the shortened portions and rest on the files 15 above the supports formed at the lower edges of the notches 45.

A thumbscrew 47 extends downwardly through a non-threaded hole 48 in the gauge plate 40 and is threaded through the positioning member 46 whereby it may be tightened to simultaneously draw the positioning member upwardly against the files 15 and press the foot portions 44 downwardly against the files 15 and thus securely clamp the files.

The blade guide assembly in the apparatus shown in Figs. 7–13 comprises a channel shaped file holding member 50 having notches 51 in both ends for the reception of the files 15 and having slots 52 in the upper portion thereof. The file holding member 50 also has threaded holes 53 in the side flanges for the reception of guide screws 54 and has a centrally positioned threaded hole 55 in the top for the reception of a thumbscrew 56 which is used for clamping purposes. A clamping member 57 of substantially U shape is provided with foot portions 58 adapted to pass through the slots 52 and rest on the files 15. A non-threaded hole 60 is provided in the top side of the U shaped clamping member 57 for the thumbscrew 56 to pass through. The thumbscrew 56 also passes through the slot 52 in the gauge plate 40. Two washers 61 are provided on the thumbscrew 56 on opposite sides of the gauge plate 40 and a compression spring 62 is provided on said thumbscrew between the uppermost washer 61 and the top portion of the clamping member 57. The guide screws 57 are adjustable to compensate for wear and for blades of different thickness and said guide screws may be provided with lock nuts 63 and with compression springs 64 to prevent them from getting out of adjustment during use and after they have been set. If desired the lock nuts 63 may be used without the springs 64 or the springs may be used without the lock nuts as either alone is sufficient to hold the screws in adjusted position for ordinary use of the tool.

When the thumbscrew 56 is screwed downwardly into the hole 55 it draws the file holding member 50 upwardly against the files 15 and at the same time forces the foot portions 58 downwardly against the files 15 thus clamping the files very securely in the blade guide assembly. The spring 62 is strong enough to firmly clamp the blade guide assembly to the gauge plate 40 when the thumbscrew 56 is tightened but will release its pressure enough to permit the blade guide assembly to be adjusted lengthwise of the gauge plate 40 when the thumbscrew 56 is loosened.

The operation of the sharpener shown in Figs. 7 to 13 inclusive is substantially the same as the operation of the sharpener disclosed in Figs. 1 to 6. This sharpener having the two files, is, however, faster in its operation than the sharpener which carries only one file and imparts a straighter edge to the blades, due to its greater width, and it further sharpens each blade entirely to both ends, due to the fact that the files 15 extend beyond, or overhang the ends of the blade guide assembly and will travel entirely to, or beyond, the ends of the blades before any part of the sharpening tool strikes against the frame parts of the lawn mower.

The foregoing description and accompanying drawings clearly disclose a preferred embodiment of my invention but it will be understood that this disclosure is merely illustrative and that such changes in the invention may be made as are fairly within the scope and spirit of the following claims.

I claim:

1. In a lawn mower sharpener for use with a file, a supporting bar, a positioning member secured to one end portion of said supporting bar and adapted to slidably engage a truss rod of a lawn mower, a blade guide member mounted on said bar and adjustable longitudinally along the bar and adapted to engage with and position the blade of a lawn mower, said positioning member and said blade guide member both having openings through which the supporting bar and a file extend in substantially parallel spaced apart relation, screw means threaded through said bar and clamping said bar and said file to said positioning member, a nut positioned in said blade guide member between said bar and said file, and a screw extending through said blade guide member and threaded into said nut.

2. In a lawn mower sharpener for use with a file, a supporting bar, a positioning member secured to one end portion of said supporting bar, said positioning member having forked means adapted to fit over and be slidably guided by the transverse truss bar of a lawn mower, a blade guide member mounted on said supporting bar and longitudinally adjustable along the bar and adapted to engage with and position the blade of a lawn mower, said positioning member and said blade guide member both having openings through which the supporting bar and a file extend in spaced apart relation and substantially parallel to each other, screw means threaded through said bar and clamping said bar and said file to said positioning member, a nut positioned in said blade guide member between said bar and said file, and a screw extending through said blade guide member and the slot in said bar and threaded into said nut, the end of said screw being positioned for clamping engagement with said file.

3. In a lawn mower sharpener for use with a file, a supporting bar having a longitudinal slot positioned near one end thereof, a positioning member fixedly connected with the other end of said supporting bar, said positioning member having forked means engagable with a transverse truss rod of a lawn mower and having openings through which said supporting bar and a file extend, means clamping said file and said supporting bar against opposite sides of the openings in said positioning member, a blade guide member of inverted channel shape having openings in opposite side flanges thereof through which said supporting bar and said file extend, a nut within said blade guide positioned between said file and said supporting bar, a screw extending through the upper wall of said channel shaped blade guide member and through the slot in said bar and threaded through said nut and positioned to thrust against said file, and blade engaging guide members positioned below the file and secured to said channel shaped blade guide member.

4. In a lawn mower sharpener for use with a file, a supporting bar having a longitudinal slot positioned near one end thereof, a positioning member of inverted U shape provided with forked lower end portions adapted to straddle and be guided on a transverse truss rod of a lawn mower and having openings in the side portions thereof through which said bar and a file extend, a screw extending loosely through the upper wall of said positioning member and threaded through the end portion of said bar which is remote from said slot and arranged to thrust against the file, whereby the file and the bar will be clamped against opposite sides of the openings in said positioning member, a blade guide member of inverted channel shape having openings in opposite side flanges thereof through which said supporting bar and said file extend, a nut positioned within said channel shaped member between said bar and said file, a screw extending loosely through the upper wall of said blade guide member and through the slot in said bar and threaded through said nut and positioned to thrust against said file, and blade engaging guide members positioned below said file and secured to said channel shaped member.

5. In a lawn mower sharpener, a duplex file holder adapted to receive and hold two files, embodying a supporting bar, a positioning member secured to one end of said supporting bar, said positioning member having forked guide means arranged to straddle and ride upon a transverse truss rod of a lawn mower, a blade guide member of inverted channel shape adjustably mounted on said supporting bar, notches in both sides of said blade guide member and said positioning member adapted to receive therein two files, the depth of the notches being less than the width of the files whereby the files extend beyond the edges of the positioning member and the blade guide member, clamping means securing said files to said positioning member, and other clamping means securing said supporting bar and said file to said blade guide member.

6. In a lawn mower sharpener, a duplex file holder adapted to receive and hold two files, embodying a supporting bar having a longitudinal slot positioned adjacent one end portion and having two flnges extending sidewise from opposite sides of the other end portion thereof and bent at substantially right angles to form two foot portions adapted to rest upon and clamp the files, a positioning member disposed between said two foot portions and having forked guide means engageable with the transverse truss rod of a lawn mower and further having notches extending from both edges inwardly and adapted to receive two files which are disposed at opposite sides of said positioning member, a screw extending loosely through said bar and threaded into said positioning member whereby tightening of said screw will clamp said files, and a blade guide member longitudinally adjustable on the slotted end of said supporting bar, said blade guide member having file receiving and file clamping means.

7. In a lawn mower sharpener, a duplex file holder adapted to receive and hold two files, said file holder embodying a supporting bar having a longitudinal slot positioned adjacent one end portion and having two flanges extended sidewise from opposite sides of the other end portion, said flanges being bent at substantially right angles to the plane of the bar to form two foot portions adapted to rest upon and clamp the files, a positioning member disposed between said two foot portions and having forked means on the lower end portion thereof and further having notches extending from both edges inwardly and adapted to receive the two files, a screw extending through said bar and threaded through said positioning member and adapted to draw said bar and said positioning member toward each other to securely clamp the files, a blade guide member of inverted channel shape having slots in the top wall thereof and having notches extending from both ends inwardly to receive the files, a clamping member of inverted U shape positioned with its side flanges extending through the slots in the top of said blade guide member and resting on the files, a screw extending through said U shaped clamping member and through the slot in said supporting bar and threaded through said channel shaped blade guide member, whereby said clamping member and said blade guide member may be clamped on the files, and blade engaging guide means carried by said blade guide member and positioned below said files.

8. In a lawn mower sharpener, a duplex file holder adapted to receive and hold two files, said file holder embodying a supporting bar having a longitudinal slot positioned adjacent one end portion thereof, a file holding and sharpener positioning member secured to the other end portion of said supporting bar, a blade guide member of inverted channel shape having slots in the top wall thereof and having notches extending from both ends inwardly to receive the two files, a clamping member of inverted U-shape having side flanges extending through the slots in said top of said blade guide member and engaging the files, a screw extending in unthreaded relation through said U shaped clamping member and through the slot in said supporting bar and being threaded through said channel shaped blade guide member, a compression spring on said screw between said supporting bar and the upper portion of said U shaped clamping member, and blade engaging guide means carried by said blade guide member and positioned below said files.

OLOF B. GERDIN.